United States Patent
Torimaru et al.

(10) Patent No.: US 7,152,177 B2
(45) Date of Patent: Dec. 19, 2006

(54) MICROCOMPUTER AND COMPUTER SYSTEM

(75) Inventors: Yasuhiro Torimaru, Tokyo (JP); Hiroshi Yoshimura, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 845 days.

(21) Appl. No.: 09/939,751

(22) Filed: Aug. 28, 2001

(65) Prior Publication Data

US 2002/0112192 A1 Aug. 15, 2002

(30) Foreign Application Priority Data

Feb. 13, 2001 (JP) .............................. 2001-035177

(51) Int. Cl.
*G06F 1/04* (2006.01)

(52) U.S. Cl. ..................................... 713/500

(58) Field of Classification Search ................ 713/500, 713/600, 601; 714/12, 55, 51
See application file for complete search history.

(56) References Cited

U.S. PATENT DOCUMENTS

| | | | | |
|---|---|---|---|---|
| 5,392,437 A | * | 2/1995 | Matter et al. | ............... 713/324 |
| 5,546,588 A | * | 8/1996 | Deems et al. | ............... 713/310 |
| 5,886,582 A | * | 3/1999 | Stansell | ...................... 331/1 A |
| 6,085,325 A | * | 7/2000 | Jackson et al. | ............. 713/300 |

FOREIGN PATENT DOCUMENTS

| | | |
|---|---|---|
| JP | SHO 58-101233 | 7/1983 |
| JP | 63-157254 | 6/1988 |
| JP | 63-211417 | 9/1988 |
| JP | 03-278210 | 12/1991 |
| JP | 03-282804 | 12/1991 |
| JP | 06-195160 | 7/1994 |
| JP | 08-063451 | 3/1996 |
| JP | 10-133714 | 5/1998 |
| JP | 11338572 A | * 12/1999 |

* cited by examiner

*Primary Examiner*—Thomas Lee
*Assistant Examiner*—Mark Connolly
(74) *Attorney, Agent, or Firm*—Arent Fox PLLC (57) ABSTRACT

The microcomputer includes the oscillation circuit which outputs an oscillation signal and stops output of the oscillation signal when it receives an oscillation stop signal. The microcomputer receives the wakeup signal of a predetermined cycle at the wakeup terminal. There is provided the clock control circuit which receives the wakeup signal and the oscillation signal, outputs the oscillation stop signal thereby making the oscillation circuit stop output of the oscillation signal, and stops output of the oscillation stop signal based on the wakeup signal thereby making the oscillation circuit restart output of the oscillation signal.

20 Claims, 8 Drawing Sheets

MICROCOMPUTER AND COMPUTER SYSTEM

FIELD OF THE INVENTION

The present invention relates to a microcomputer and a computer system. More particularly, this invention relates to a one-chip microcomputer, for example used in vehicles, and having a stop releasing function for prime oscillation. This invention also relates to a computer system that uses such a microcomputer.

BACKGROUND OF THE INVENTION

Generally, there is a state known as deadlock as an abnormal operation in the microcomputer. During deadlock, prime oscillation is stopped unexpectedly and the operation mode shifted from run to stop due to the generation of broken data in some latch circuits. The broken data is generated because of sudden changes in supply voltage or influence of external noise etc. The CPU has no control on the occurrence of the deadlock. One-chip microcomputer are used in vehicles for controlling electronic equipment. It is very important to provide a fail safe function in such microcomputers to prevent generation of a deadlock.

Conventionally, there is known an external reset function to realize the fail safe function. In this external reset function, a reset signal is input into a reset terminal of the microcomputer from outside and the CPU is reset to initial state. There is also know an external interrupt function or non-maskable interrupt (NMI) function to realize the fail safe function. In this external interrupt function or non-maskable interrupt (NMI) function, an interrupt requesting signal is input into an external interrupt (INT) terminal or a non-maskable terminal of the microcomputer from outside. As a consequence, an interrupt occurs, and an interrupt processing is executed.

However, in the external reset function, since internal register value is initialized because of the reset, there is a problem that the data is lost. There maybe thought of a method that does not -initialize the needful resources even if the reset signal is input. However, such method is not practical because needful resources that should not be initialized differ depending upon how and where the microcomputer is being used.

Moreover, in the external interrupt function, only when it is transited to state of stop after permission of external interrupt is set by software, state of stop is released by means of input of the interrupt requesting signal. Therefore, when it is transited to state of stop before setting of permission of interrupt, state of stop cannot be released. In addition, in the non-maskable interrupt function, there is a problem that since interrupt processing is executed unconditionally in not only state of stop but also normal state of run, unnecessary code is executed by execution of interrupt processing in normal state of run.

SUMMARY OF THE INVENTION

It is an object of the present invention to provide a microcomputer having a fail safe function such that state of stop can be released by only hardware without intervention of software factors and thereby the deadlock is avoided.

The microcomputer according to one aspect of the present invention comprises an oscillation circuit which oscillates and outputs an oscillation signal and stops the oscillation during a period in which it receives an oscillation stop signal; a wakeup terminal that receives from outside a wakeup signal of a predetermined cycle; and a clock control circuit which receives the wakeup signal, outputs the oscillation stop signal, and stops output of the oscillation stop signal based on the wakeup signal.

In normal state of run, the oscillation signal is supplied from the oscillation circuit to the clock control circuit. The clock control circuit generates a main clock signal based on the oscillation signal. Moreover, in normal state of run, the clock control circuit ignores the wakeup signal in order not to affect its operation state.

On the other hand, in state of stop, the clock control circuit supplies an oscillation stop signal to the oscillation circuit, thereby the oscillation circuit stops oscillation. In this state, when the wakeup signal is input into the clock control circuit, the clock control circuit forces the oscillation stop signal to release. When the oscillation stop signal is released, the oscillation circuit resumes oscillation. The microcomputer becomes normal state of run through state of oscillation stability wait.

Moreover, the computer system according to another aspect of the present invention comprises the above-mentioned microcomputer and a wakeup signal supplying unit that supplies the wakeup signal on predetermined cycle constantly.

Other objects and features of this invention will become apparent from the following description with reference to the accompanying drawings.

DESCRIPTION OF THE PREFERRED EMBODIMENTS

Embodiments of a microcomputer and a computer system according to the present invention will be described below in detail with reference to the accompanying drawings.

Figure 1:
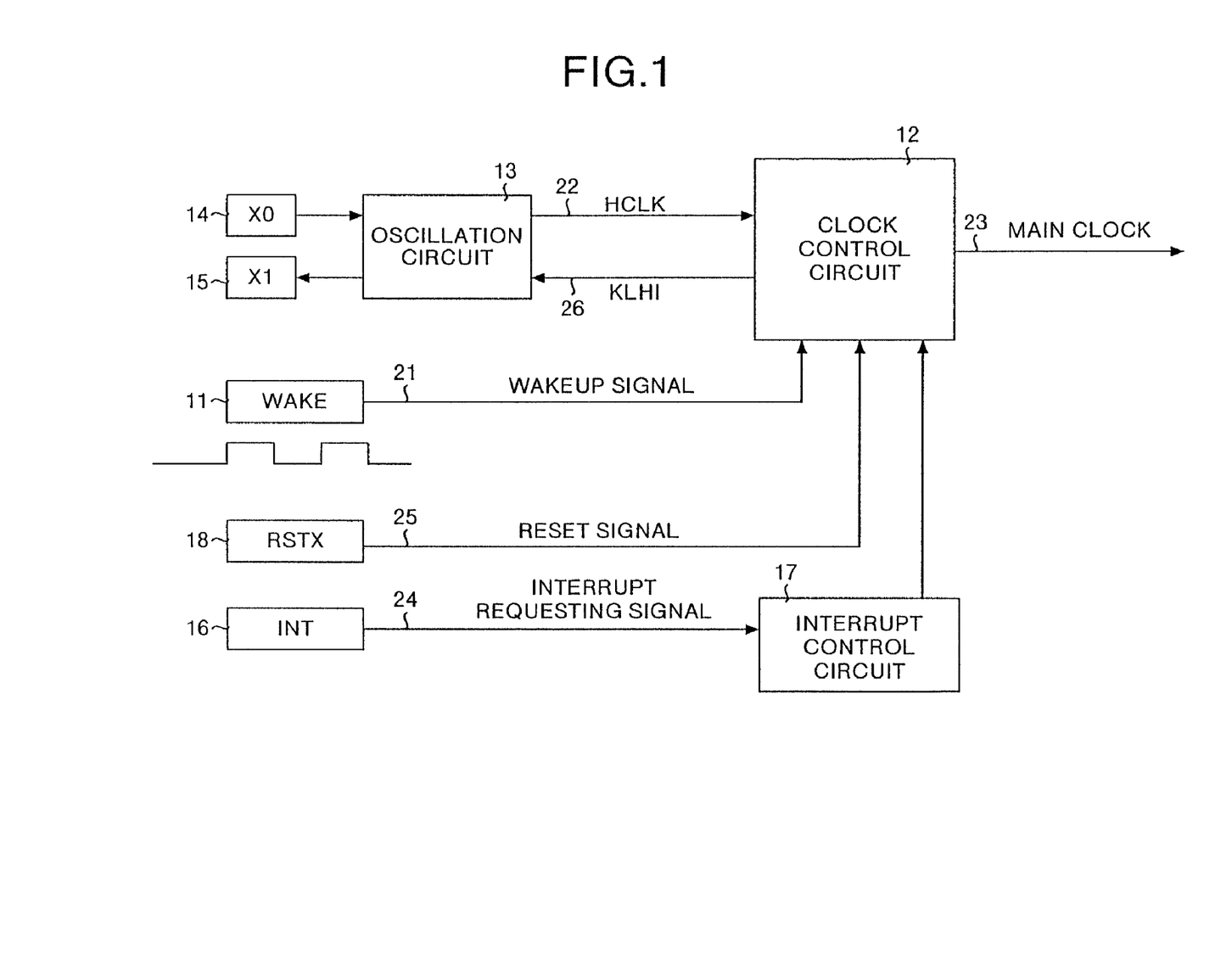
FIG. 1 is a block diagram showing a main section of the microcomputer of the embodiment of the present invention.
Figure 2:
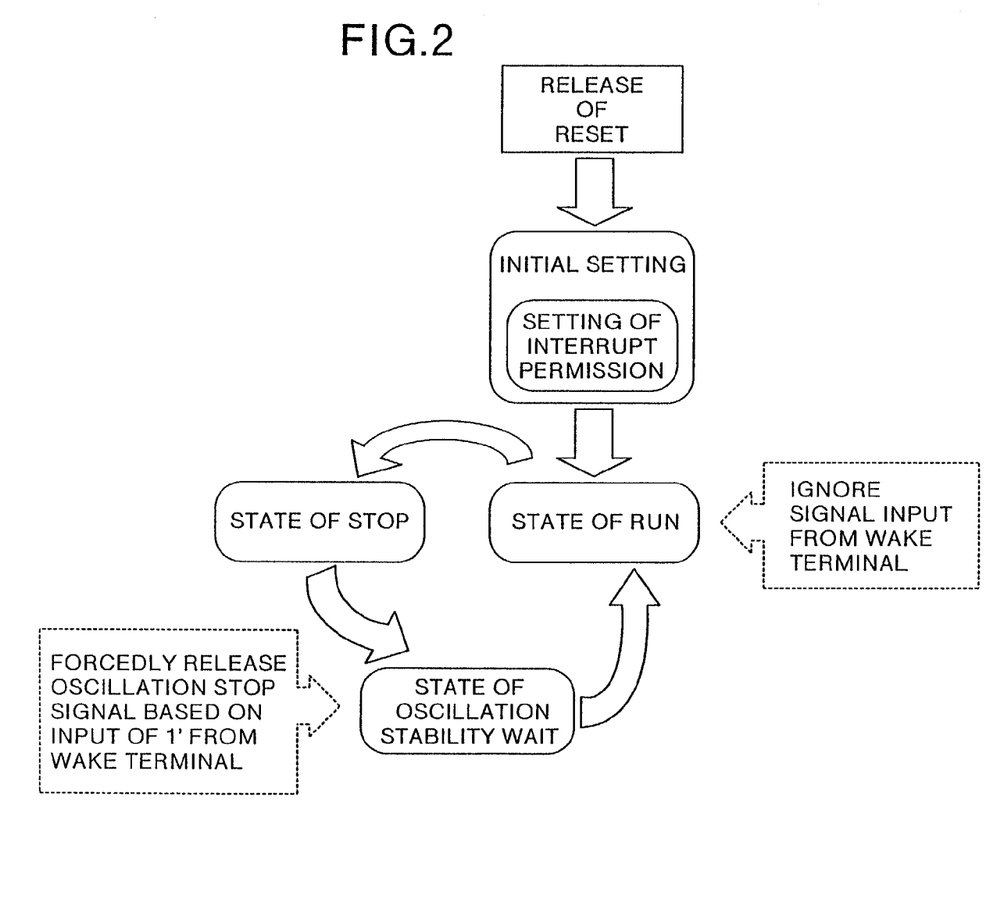
FIG. 2 is a state transition diagram for explaining the transition of operation state of the microcomputer of the embodiment of the present invention.

FIG. 1 is a block diagram showing required sections of the microcomputer according to an embodiment of the present invention. FIG. 2 is a state transition diagram of the microcomputer. The microcomputer has the wakeup terminal 11 to which the wakeup signal 21 is supplied from outside on suitable cycle. The wakeup signal 21 is then supplied to the clock control circuit 12. A not shown oscillator is connected with the oscillation circuit 13 through oscillation terminals 14, 15 shown by X0, X1.

In normal state of run, the oscillation signal (HCLK) 22 is supplied from the oscillation circuit 13 to the clock control circuit 12. The clock control circuit 12 generates the main clock signal 23 based on the oscillation signal 22 to supply the signal 23 to various circuits (not shown) in the microcomputer. Moreover, in normal state of run, the clock control circuit 12 ignores the wakeup signal 21 in order not to affect its operation state.

In state of stop, the clock control circuit 12 supplies the oscillation stop signal 26 (KLHI) to the oscillation circuit 13, thereby the oscillation circuit 13 stops oscillation. In this state, when the wakeup signal 21 is input into the clock control circuit 12, the clock control circuit 12 forces the oscillation stop signal 26 to release. When the oscillation stop signal 26 is released, the oscillation circuit 13 resumes oscillation. The microcomputer becomes normal state of run through state of oscillation stability wait.

Moreover, the microcomputer executes interrupt processing when the interrupt requesting signal 24 is supplied to the interrupt control circuit 17 from outside through the external interrupt (INT) terminal 16. In addition, the microcomputer returns to initial state when the reset signal 25 is supplied from outside through the reset (RSTX) terminal 18.

Figure 3:
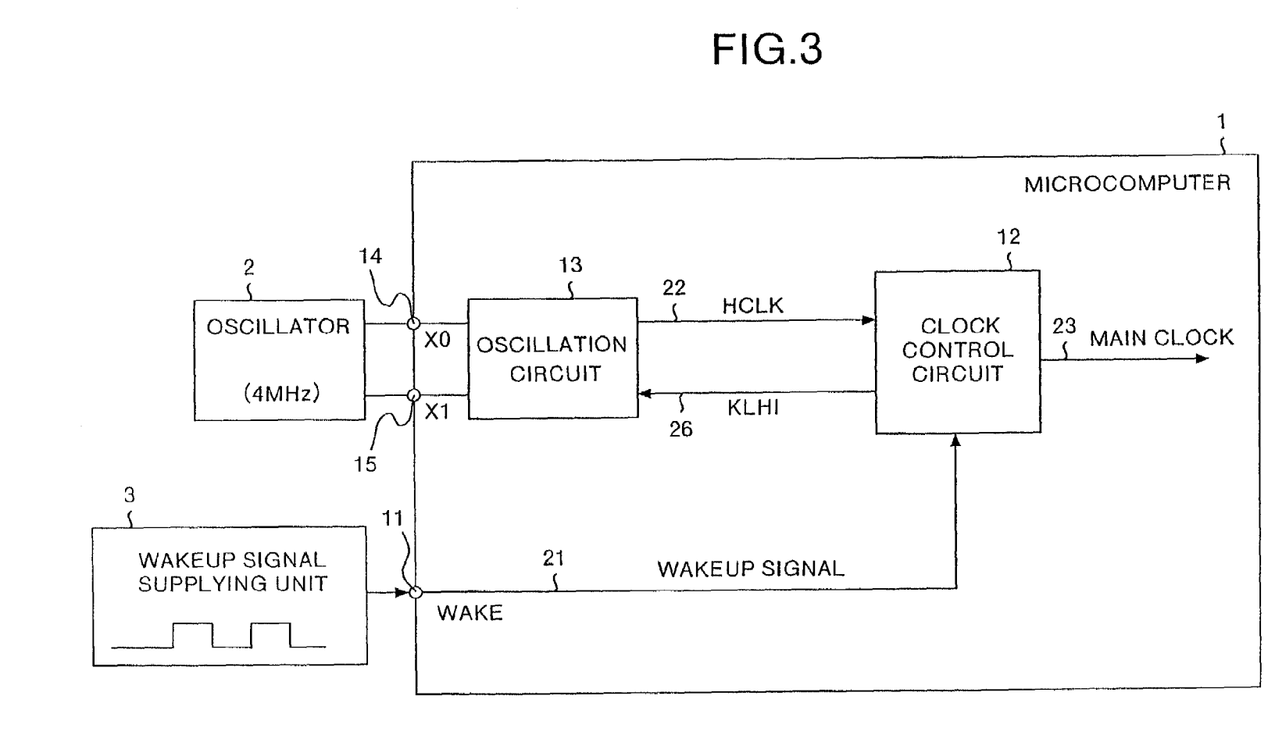
FIG. 3 is a block diagram showing a main section of the microcomputer of a first embodiment of the present invention.
Figure 4:
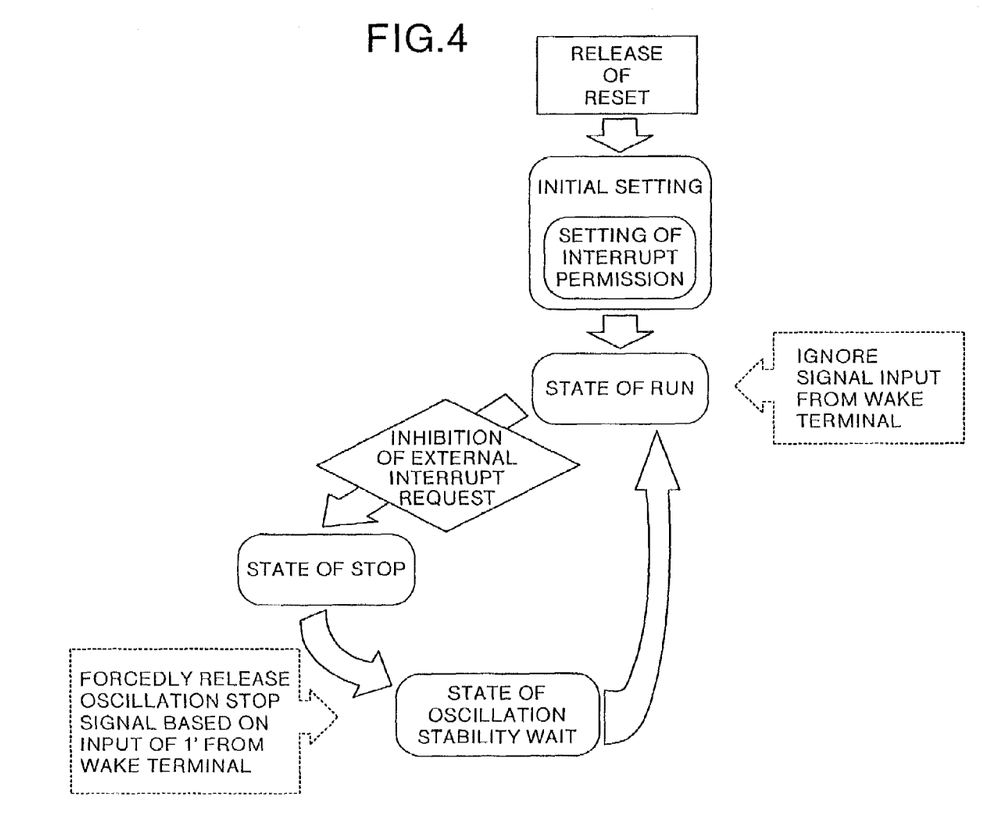
FIG. 4 is a state transition diagram for explaining the transition of operation state of the microcomputer of the first embodiment.

FIG. 3 is a block diagram showing only required sections of the microcomputer according to a first embodiment of the present embodiment. FIG. 4 is a state transition diagram of the microcomputer according to the first embodiment. The microcomputer 1 shown in FIG. 3 has the same configuration as the microcomputer shown in FIG. 1, therefore, repetition of explanation will be omitted. The oscillator 2 is connected with oscillation terminals 14, 15. The oscillator 2 is a crystal oscillator whose oscillation frequency is 4 MHz, for example. The wakeup signal supplying unit 3 is connected with the wakeup terminal 11.

The wakeup signal supplying unit 3 always generates H level signal whose potential level is relatively high by constant cycle, for example, 4 sec. to supply it to the wakeup terminal 11. The signal input from the wakeup terminal 11 is supplied to the clock control circuit 12 as the wakeup signal 21. The oscillator 2 and the wakeup signal supplying unit 3 are arranged out of the microcomputer 1. The external interrupt terminal, the interrupt control circuit and the reset terminal are not shown and omitted.

The clock control circuit 12 ignores the input the wakeup signal 21 in normal state of run, that is, in state in which the oscillation signal 22 is supplied from the oscillation circuit 13. Thus, even if the wakeup signal 21 is input into the clock control circuit 12 in normal state of run, state of the microcomputer 1 dose not change, and it is not transited to state of stop. When the microcomputer 1 transits to state of stop by cause such as occurrence of data illegibility in some latch circuits, the clock control circuit 12 supplies the oscillation stop signal 26 to the oscillation circuit 13. By input of the oscillation stop signal 26, the oscillation circuit 13 stops oscillation, and the microcomputer 1 transits to state of stop. At this time, internal register value is held as it is, thereby state of Input/Output is stored.

At this time, if it is transited to state of stop with external interrupt request prohibited by software, interrupt does not occurred even if the interrupt request signal is input from the external interrupt terminal not shown to the microcomputer 1. In other words, in this case, state of stop cannot be released by means of external interrupt. However, in this embodiment, the clock control circuit 12 comprises function that the circuit 12 forces the oscillation stop signal 26 to release when the wakeup signal 21 is input at the time of state of stop.

Therefore, the oscillation stop signal 26 is released forcedly, and the oscillation circuit 13 resumes oscillation. After resumption of oscillation, the microcomputer 1 returns to normal state of run through state of oscillation stability wait and resumes processing from the following instruction of the instruction executed just before state of stop using register value which has been held when stopping.

According to the first embodiment, since the clock control circuit 12 forces the oscillation stop signal 26 to release based on input of the wakeup signal 21 in state of stop, the oscillation circuit 13 resumes oscillation speedily even if it is transited from normal state of run to state of stop with external interrupt request prohibited. Therefore, since state of stop of prime oscillation can be released by only hardware without software, state of deadlock can be avoided.

Figure 5:
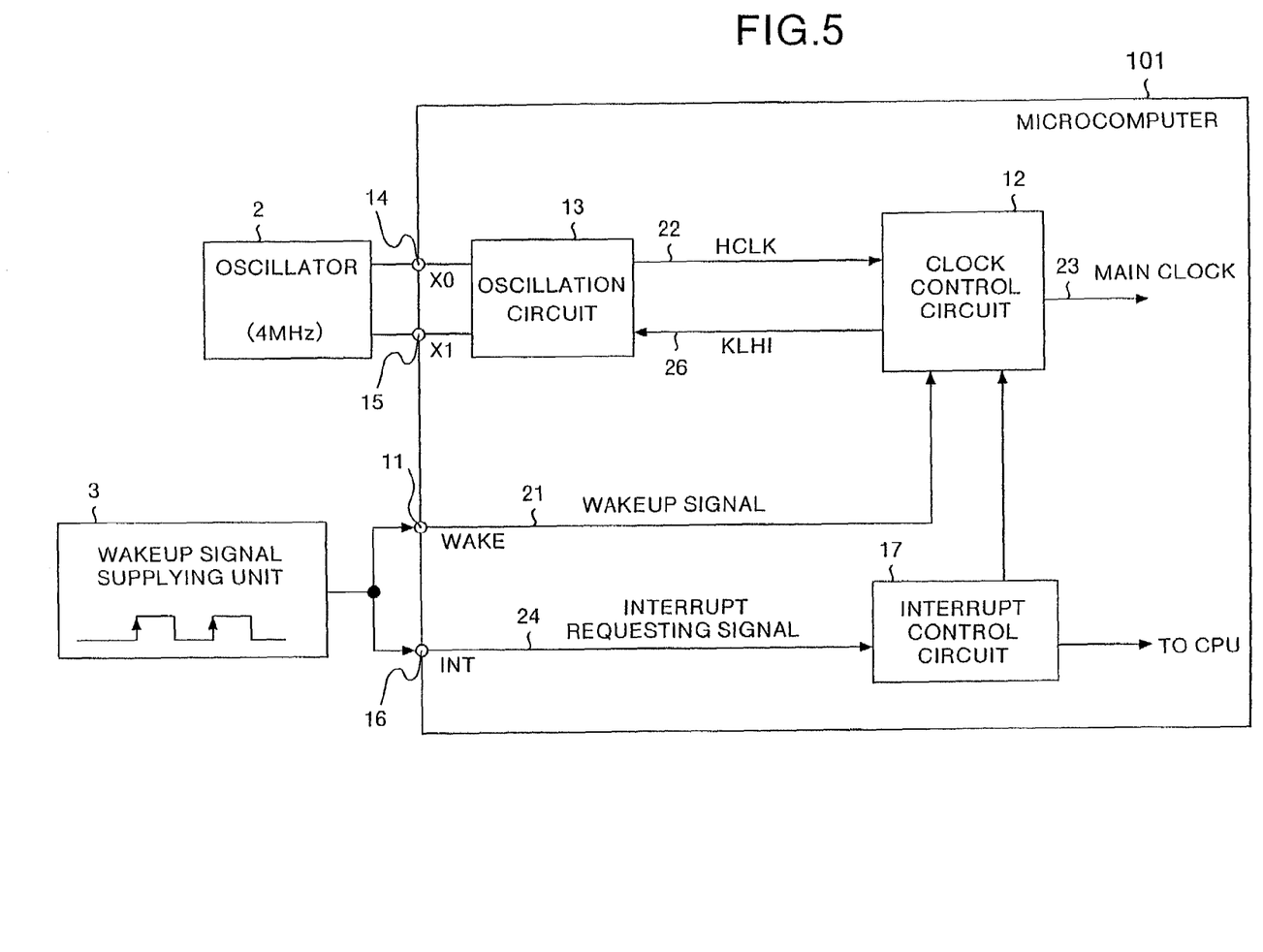
FIG. 5 is a block diagram showing a main section of the microcomputer of a second embodiment of the present invention.
Figure 6:
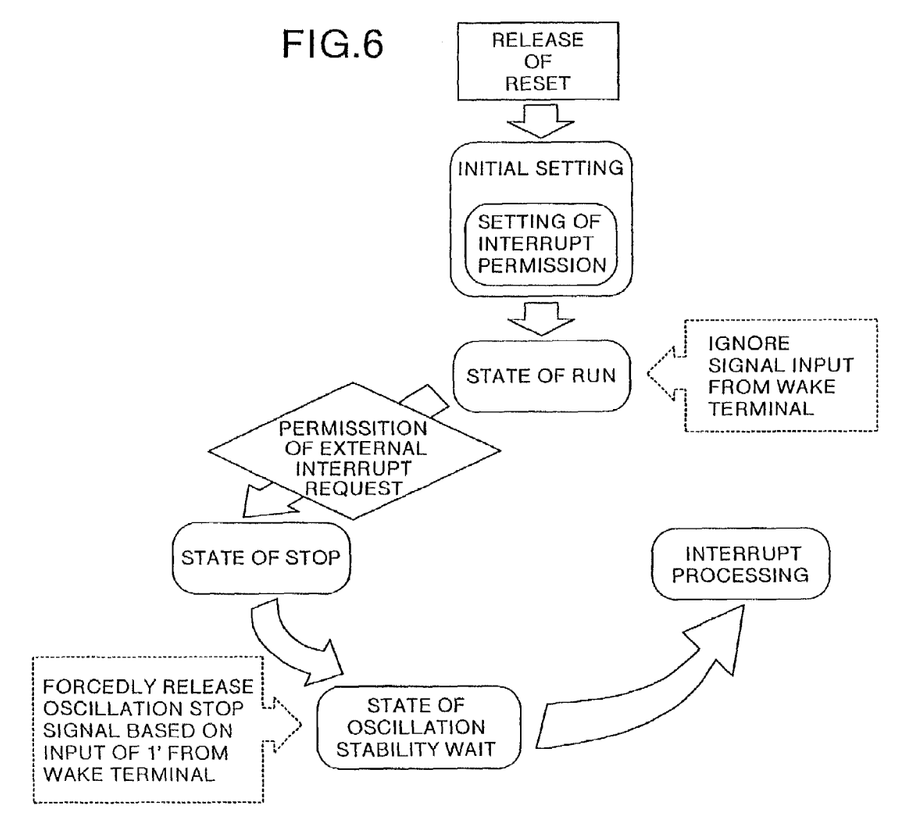
FIG. 6 is a state transition diagram for explaining the transition of operation state of the microcomputer of the second embodiment.

FIG. 5 is a block diagram showing a main section of the microcomputer according to a second embodiment of the present embodiment. FIG. 6 is a state transition diagram of the microcomputer according to the second embodiment. The second embodiment differs from the first embodiment in that a microcomputer 101 according to the second embodiment is constituted so that the signal of H level supplied from the wakeup signal supplying unit 3 is supplied to the clock control circuit 12 as the wakeup signal 21 and also to the interrupt control circuit 17 through the external interrupt terminal 16 as the interrupt requesting signal 24. Moreover, the same reference letters are added with respect to the same constitution as the first embodiment and description about them is omitted.

By such constitution, when it is transited from normal state of run to state of stop after permission of external interrupt request by software, the oscillation stop signal 26 is released forcedly by input of the wakeup signal 21 and the oscillation circuit 13 resume so scillation. At this time, since the interrupt requesting signal 24 is input into the interrupt control circuit 17, for example, leading edge of the interrupt requesting signal 24 is detected, thereby interrupt is created, and then after state of oscillation stability wait the CPU not shown executes interrupt processing.

When it is transited to state of stop with external interrupt request prohibited by software, interrupt does not occurred even if the interrupt request signal 24 is input into the interrupt control circuit 17 at the same time that prime oscillation is resumed. Therefore, in this case, the microcomputer 101 returns to normal state of run like the first embodiment. In the second embodiment, when external interrupt request is permitted in normal state of run, interrupt occur by means of the signal input as the interrupt requesting signal 24 from the external interrupt terminal 16.

According to the second embodiment, since the clock control circuit 12 forces the oscillation stop signal 26 to release based on input of the wakeup signal 21 in state of stop, the oscillation circuit 13 resumes oscillation speedily even if it is transited from normal state of run to state of stop. At this time, since the interrupt request signal 24 is supplied to the interrupt control circuit 17, if prime oscillation is resumed from state that it is transited to state of stop after permission of external interrupt request, the microcomputer 101 executes interrupt processing. Therefore, since state of stop of prime oscillation can be released and interrupt processing can be executed by only hardware without software, state of deadlock can be avoided.

Figure 7:
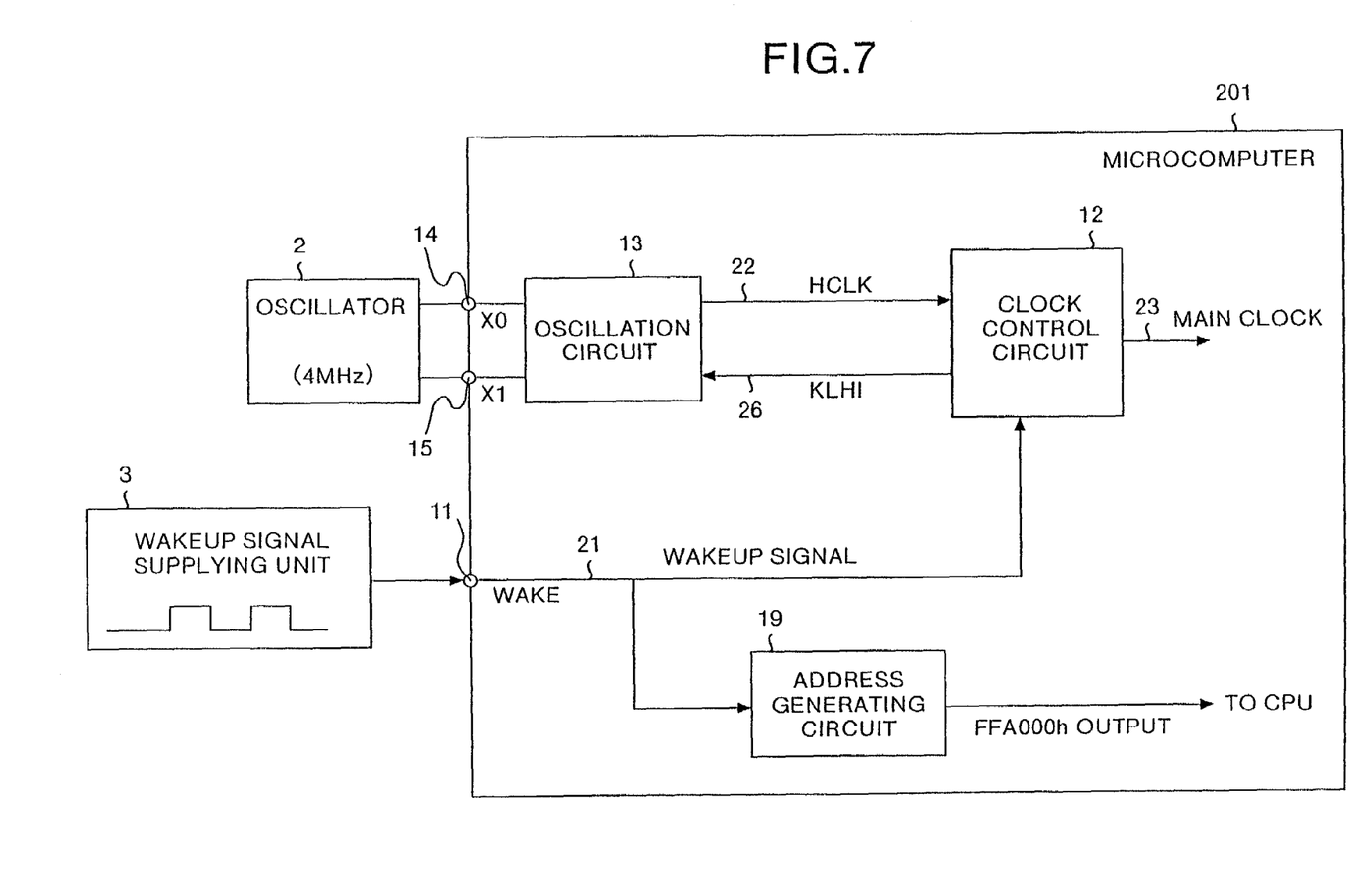
FIG. 7 is a block diagram showing a main section of the microcomputer of a third embodiment of the present invention.
Figure 8:
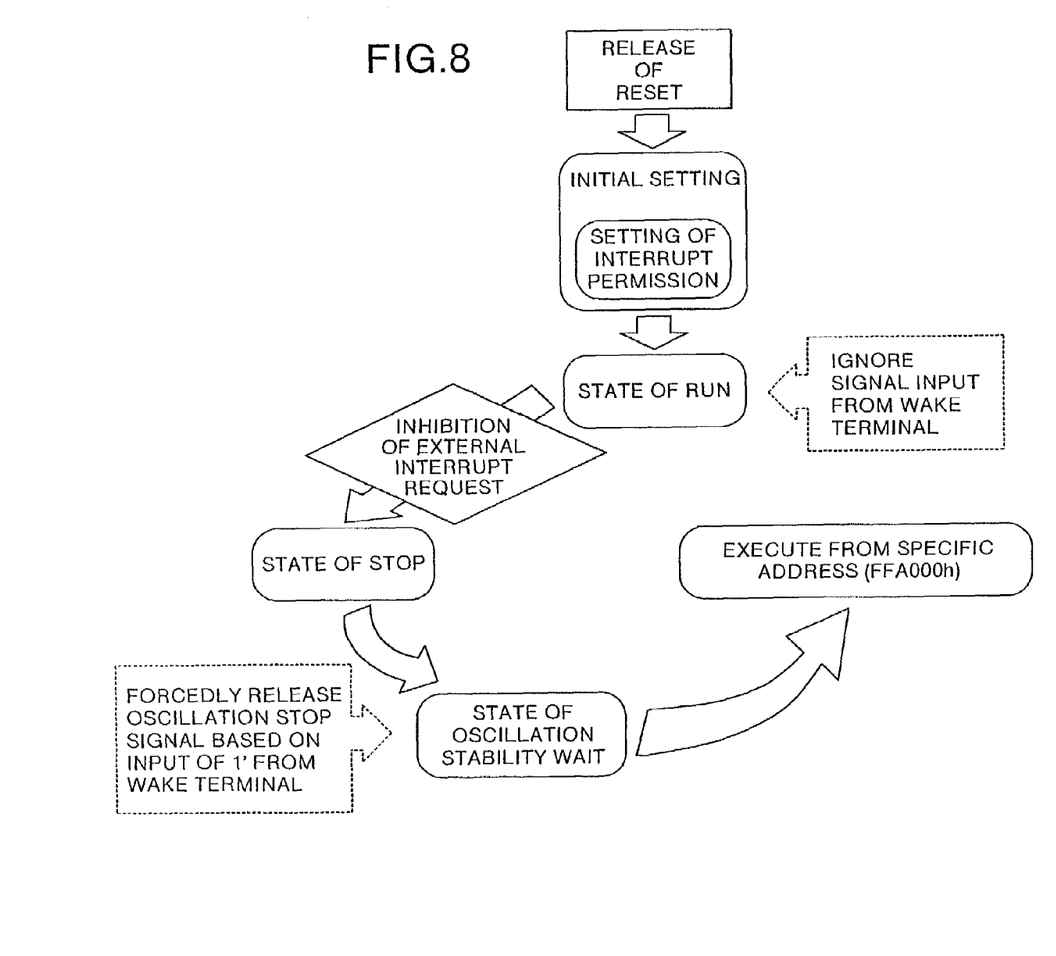
FIG. 8 is a state transition diagram for explaining the transition of operation state of the microcomputer of the third embodiment.

FIG. 7 is a block diagram showing a main section of the microcomputer according to a third embodiment of the present embodiment. FIG. 8 is a state transition diagram of the microcomputer according to the third embodiment. The third embodiment differs from the first embodiment in that a microcomputer 201 according to the third embodiment comprises an address generating circuit 19 outputting predetermined address and is constituted so that the signal of H level supplied from the wakeup signal supplying unit 3 is supplied to the clock control circuit 12 as the wakeup signal 21 and also to the address generating circuit 19. Moreover, the same reference letters are added with respect to the same constitution as the first embodiment and description about them is omitted.

By such constitution, when it is transited from normal state of run to state of stop with external interrupt request prohibited, the oscillation stop signal 26 is released forcedly by input of the wakeup signal 21 and the oscillation circuit 13 resumes oscillation. The microcomputer 201 is transited to state of oscillation stability wait. Moreover, since the wakeup signal 21 is input into the address generating circuit 19 as a trigger signal for generating address at the same time that prime oscillation is resumed, the address generating circuit 19 outputs specific address set beforehand, for example, FFA000h. Then, after state of oscillation stability wait, the CPU not shown executes processing from instruction in memory space of FFA000h.

According to the third embodiment, since the clock control circuit 12 forces the oscillation stop signal 26 to release based on input of the wakeup signal 21 in state of stop, the oscillation circuit 13 resumes oscillation speedily even if it is transited from normal state of run to state of stop with external interrupt request prohibited. At this time, since specific address is output from the address generating circuit 19, the microcomputer 201 executes processing from instruction in memory space corresponding to its address. Therefore, since state of stop of prime oscillation can be released by only hardware without software and processing can be executed from instruction in memory space of specific address, state of deadlock can be avoided.

It is to be understood that the invention is not limited to the specific embodiments thereof and various changes and modifications may be made in the invention. For example, constitution in which an automatic start type watch dog timer which always operates at the time that the oscillation circuit 13 is oscillating is contained in the microcomputer as fail safe function for runaway of program after release of state of stop may be possible. Moreover, the present invention may be applied to not only one-chip microcomputer but also a microcomputer carried on the same LSI package, one-board microcomputer and system microcomputer. Furthermore, in the third embodiment, the address generating circuit 19 may be arranged outside the microcomputer 201.

According to the present invention, state of stop of prime oscillation can be released by only hardware without software. Therefore, a microcomputer having a fail safe function that prevents generation of deadlock can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A microcomputer comprising:
   an oscillation circuit which oscillates and outputs an oscillation signal and stops the oscillation during a period in which it receives an oscillation stop signal;
   a wakeup terminal that receives from outside a wakeup signal of a predetermined cycle; and
   a clock control circuit which receives the wakeup signal, outputs the oscillation stop signal, and stops output of the oscillation stop signal based on the wakeup signal, and which receives the oscillation signal from said oscillation circuit and generates a main clock based on the oscillation signal.

2. The microcomputer according to claim 1, wherein said clock control circuit nullifies the wakeup signal received when the oscillation signal is output from said oscillation circuit.

3. The microcomputer according to claim 1, further comprising a register which stores history information related to the executed commands as register value,
   wherein when said clock control circuit stops output of the oscillation stop signal, processing is executed from an instruction immediately following the instruction that was executed just before stopping the oscillation of said oscillation circuit based on a value stored in said register just before stopping the oscillation of said oscillation circuit.

4. The microcomputer according to claim 1, further comprising an interrupt control circuit to which the signal is input as an interrupt requesting signal for executing an interrupt processing,
   wherein when the oscillation of said oscillation circuit is stopped when a permission for a request for an external interrupt has been given, and further if said clock control circuit stops output of the oscillation stop signal, said interrupt control circuit executes the signal representing the permission for the request for the interrupt is input into said interrupt control circuit.

5. The microcomputer according to claim 4, wherein the microcomputer is a one-chip microcomputer equipped with said oscillation circuit, clock control circuit, and said interrupt control circuit on the same LSI chip.

6. The microcomputer according to claim 1, further comprising an address generating circuit which receives the wakeup signal and outputs, based on the wakeup signal, a specific address corresponding to which a specific processing is to be performed,
   wherein said address generating circuit outputs the specif is address when said clock control circuit stops output of the oscillation stop signal.

7. The microcomputer according to claim 6, wherein the microprocessor is a one-chip microcomputer equipped with said oscillation circuit, clock control circuit, and said interrupt control circuit on the same LSI chip.

8. The microcomputer according to claim 1, wherein said clock control circuit receives the oscillation signal and outputs the oscillation stop signal based on a condition of the oscillation signal.

9. A microcomputer comprising:
   an oscillation circuit which oscillates and outputs an oscillation signal and stops the oscillation during a period in which it receives an oscillation stop signal;
   a wakeup terminal that receives from outside a wakeup signal of a predetermined cycle; and,
   a clock control circuit which receives the wakeup signal, outputs the oscillation stop signal to said oscillation circuit only for a specific time interval based on the wakeup signal, and receives the oscillation signal from said oscillation circuit and generates a main clock based on the oscillation signal.

10. The microcomputer according to claim 9, wherein said clock control circuit receives the oscillation signal and outputs the oscillation stop signal based on a condition of the oscillation signal.

11. A microcomputer comprising:
an oscillation circuit which oscillates and outputs an oscillation signal and stops the oscillation during a period in which it receives an oscillation stop signal;
a wakeup terminal that receives from outside a wakeup signal of a predetermined cycle; and
a clock control circuit which receives the wakeup signal and the oscillation signal, outputs the oscillation stop signal to said oscillation circuit only for a specific time interval based on the wakeup signal and the oscillation signal, and generates a main clock based on the oscillation signal.

12. The microcomputer according to claim 11, wherein said clock control circuit outputs the oscillation stop signal based on a condition of the oscillation signal.

13. A microcomputer comprising:
an oscillation circuit which oscillates and outputs an oscillation signal;
a wakeup terminal that receives from outside a wakeup signal of a predetermined cycle; and
a clock control circuit which receives the wakeup signal and the oscillation signal,
wherein said clock control circuit monitors a condition of the oscillation signal and outputs the oscillation stop signal to said oscillation circuit based on the condition of the oscillation signal thereby stopping the oscillations of said oscillation circuit, and wherein said clock control circuit generates a main clock based on the oscillation signal, and,
when said oscillation circuit is not oscillating and when specific time has lapsed, said clock control circuit stops output of the oscillation stop signal to said oscillation circuit based on the wakeup signal.

14. The microcomputer according to claim 13, wherein said clock control circuit outputs the oscillation stop signal when it does not receive the oscillation signal.

15. A microcomputer system comprising:
a wakeup signal supplying unit that generates a wakeup signal of a predetermined cycle; and
a microcomputer, said microcomputer including,
an oscillation circuit which oscillates and outputs an oscillation signal;
a wakeup terminal that always receives the wakeup signal of a predetermined cycle from said wakeup signal supplying unit; and
a clock control circuit which controls said oscillation circuit so as to stop the oscillation, and based on the wakeup signal received through said wakeup terminal controls said oscillation circuit so as to restart the oscillation, and receives the oscillation signal from said oscillation circuit and generates a main clock based on the oscillation signal.

16. A microcomputer system comprising:
a wakeup signal supplying unit that generates a wakeup signal of a predetermined cycle; and
a microcomputer, said microcomputer including,
an oscillation circuit which oscillates and outputs an oscillation signal and stops the oscillation during a period in which it receives an oscillation stop signal;
a wakeup terminal that always receives the wakeup signal of a predetermined cycle from said wakeup signal supplying unit; and
a clock control circuit which receives the wakeup signal, outputs the oscillation stop signal, and stops output of the oscillation stop signal based on the wakeup signal, and receives the oscillation signal from said oscillation circuit and generates a main clock based on the oscillation signal.

17. The microcomputer system according to claim 15, wherein said clock control circuit receives the oscillation signal and outputs the oscillation stop signal based on a condition of the oscillation signal.

18. The microcomputer system according to claim 16, wherein said clock control circuit nullifies the wakeup signal received when the oscillation signal is output from said oscillation circuit.

19. A microcomputer system comprising:
a wakeup signal supplying unit that generates a wakeup signal of a predetermined cycle; and an oscillation circuit which oscillates and outputs an oscillation signal;
a wakeup terminal that receives from outside a wakeup signal of a predetermined cycle; and
a clock control circuit which receives the wakeup signal and the oscillation signal,
wherein said clock control circuit monitors a condition of the oscillation signal and outputs the oscillation stop signal to said oscillation circuit based on the condition of the oscillation signal thereby stopping the oscillations of said oscillation circuit, and wherein said clock control circuit generates a main clock based on the oscillation signal, and,
when said oscillation circuit is not oscillating and when specific time has lapsed, said clock control circuit stops output of the oscillation stop signal to said oscillation circuit based on the wakeup signal.

20. The microcomputer system according to claim 19, wherein said clock control circuit outputs the oscillation stop signal when it does not receive the oscillation signal.

* * * * *